Sept. 2, 1969 P. F. GIRARD 3,464,650
AIRCRAFT WITH FLAPPED ROTOR/WING
Filed Oct. 18, 1967 4 Sheets-Sheet 1

INVENTOR.
PETER F. GIRARD
BY *Knox & Knox*

Sept. 2, 1969          P. F. GIRARD          3,464,650

AIRCRAFT WITH FLAPPED ROTOR/WING

Filed Oct. 18, 1967          4 Sheets-Sheet 2

INVENTOR.
PETER F. GIRARD
BY
Knox & Knox

INVENTOR.
PETER F. GIRARD
BY
Knox & Knox

Sept. 2, 1969          P. F. GIRARD          3,464,650
AIRCRAFT WITH FLAPPED ROTOR/WING
Filed Oct. 18, 1967          4 Sheets-Sheet 4
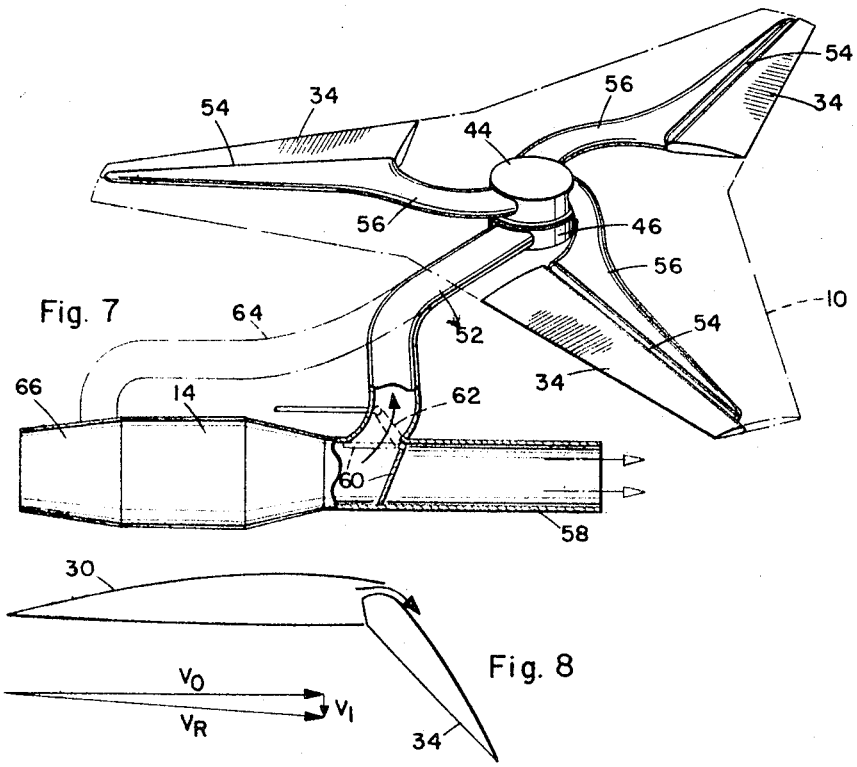
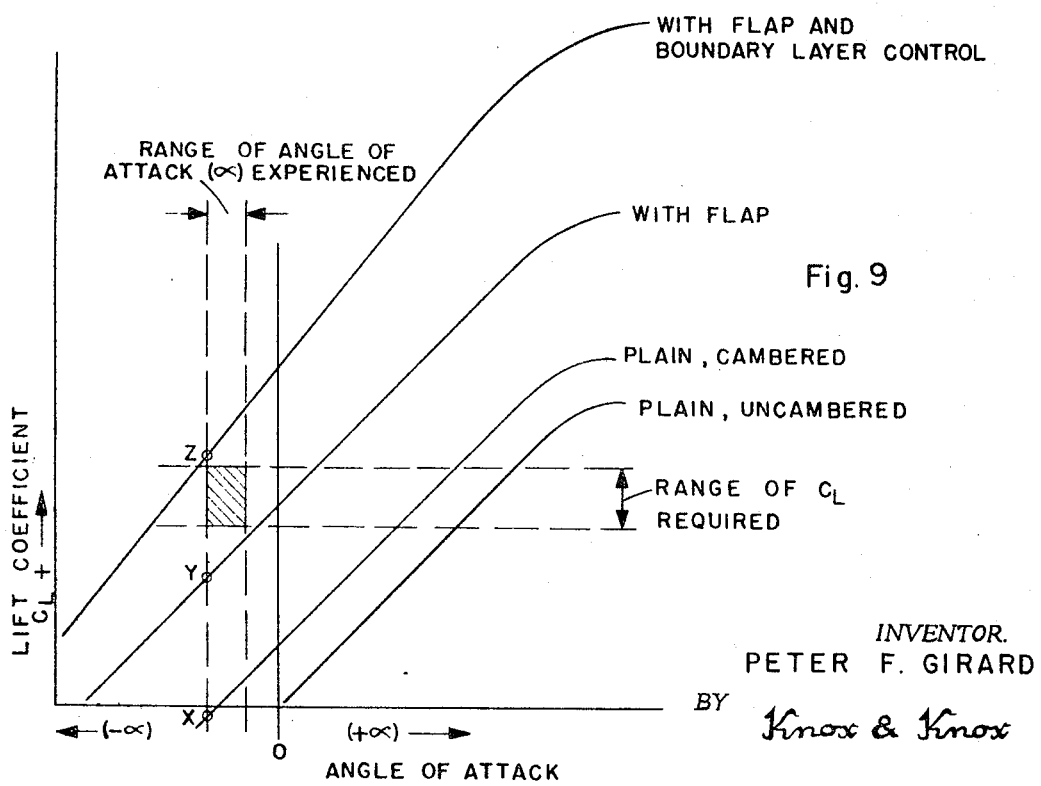
INVENTOR.
PETER F. GIRARD
BY Knox & Knox

United States Patent Office 3,464,650
Patented Sept. 2, 1969

3,464,650
AIRCRAFT WITH FLAPPED ROTOR/WING
Peter F. Girard, La Mesa, Calif., assignor to The Ryan Aeronautical Co., San Diego, Calif.
Filed Oct. 18, 1967, Ser. No. 676,113
Int. Cl. B64c 27/24
U.S. Cl. 244—7                                    4 Claims

ABSTRACT OF THE DISCLOSURE

The aircraft has a multiple armed wing which is driven in rotation to provide lift for vertical and low speed flight and is stopped in fixed wing position for forward flight, the basic rotor/wing providing the aerodynamic lift for the aircraft in all stages of flight. Portions of the trailing edges of the wing arms are hinged as flaps and provide effective pitch control of the arms; the flaps being controlled cyclically and collectively in the manner of a helicopter, but with a novel control action which avoids control reversal during transition between vertical and horizontal flight. Pressurized gases are blown over the flaps for boundary layer control and lift generation, and the gas flow can be utilized as power to rotate the wing.

Background of the invention

The present invention relates to aircraft and specifically to an aircraft with a flapped rotor/wing for vertical and short take-off and landing (V/STOL) performance.

Basic rotary wing aircraft such as helicopters are limited in forward speed due to inefficiency of a large rotor at high speeds. Stopped rotor aircraft, in which the rotor is stopped and then streamlined or stowed for cruising flight, require auxiliary lift means, such as fixed wings, to provide lift during transition and in forward flight.

Mechanism for stowing a rotor is complex and the weight of the stowed rotor detracts from payload.

Summary of the invention

The aircraft described herein utilizes a combination rotor and wing which provides the aerodynamic lift for the aircraft in all modes of flight. The wing is multiple armed and the major portion is a unitary rigid structre, each arm having a hinged flap by which the lift characteristics are varied. Collective and cyclic pitch control means actuate the flaps to provide helicopter-like control in vertical and low speed flight, and a special control arrangement prevents control reversal and unbalance during transition to and from forward flight. A flow of gas or air is ejected over the flaps to provide boundary layer control and enhance the lift and, by having a sufficiently high rate of flow, the gas can be used to drive the rotary wing. For forward flight the wing is stopped and held in a fixed position, the transition between rotary and fixed positions being smooth and occuring without loss of control or lift. The wing is adaptable to a variety of aircraft types and propulsion systems and, for the range of performance obtained, is mechanically simple.

Brief description of the drawings

FIGURE 7 is a diagrammatic view of the boundary layer control system;
FIGURE 8 is a diagram showing certain lift forces of the flapped wing;
and
FIGURE 9 is a graph showing comparative characteristics of the flapped rotor/wing and other types.

Similar characters of reference indicate similar or identical elements and portions throughout the specification and throughout the views of the drawings.

Description of the preferred embodiment

Figure 1:
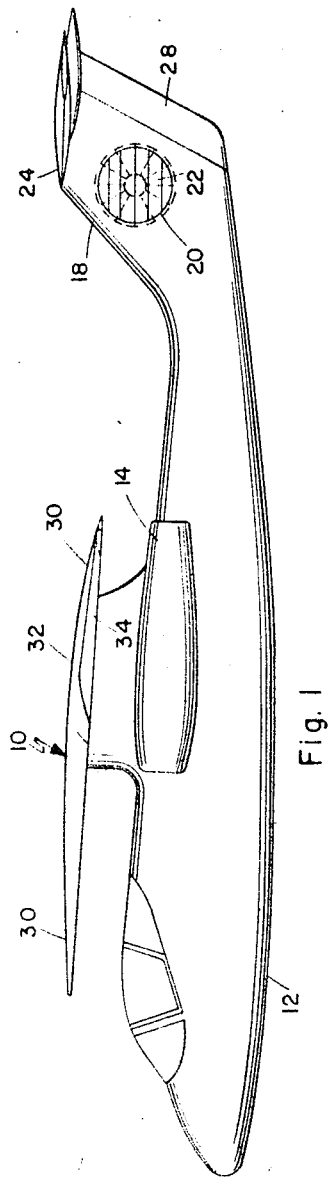
FIGURE 1 is a side elevation view of a typical aircraft incorporating the rotor/wing.
Figure 2:
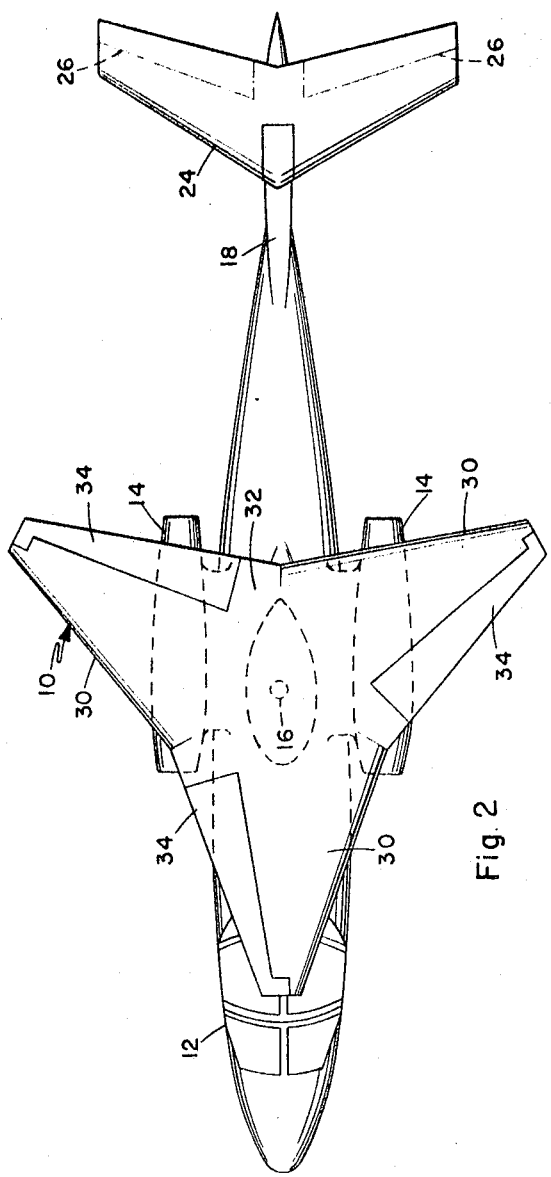
FIGURE 2 is a top plan view of the aircraft.

In FIGURES 1 and 2 the rotor/wing 10 is shown on a typical aircraft 12 powered by a pair of turbojet engines 14, the wing being mounted above the aircraft on a rotatable shaft 16 substantially perpendicular to the plane of the wing at the center of area. The vertical tail 18 contains an anti-torque and yaw control unit 20, such as a ducted fan, driven by any suitable means, and enclosed by louvers 22 when not in use. Other yaw control means may be used, various arrangements being well known in V/STOL aircraft. On top of the vertical tail 18 is a horizontal stabilizer 24, which may be of the all movable type shown, or have individually movable portions 26, indicated in broken line in FIGURE 2. These individual portions would act as conventional elevators, or could be connected to function as ailerons for roll control in forward flight in the manner of dual function elevon surfaces. Conventional aircraft controls are used to operate the horizontal stabilizer, and the rudder 28 on vertical tail 18, for control in forward flight. The aircraft configuration can vary considerably, that shown being merely an example.

Figure 3:
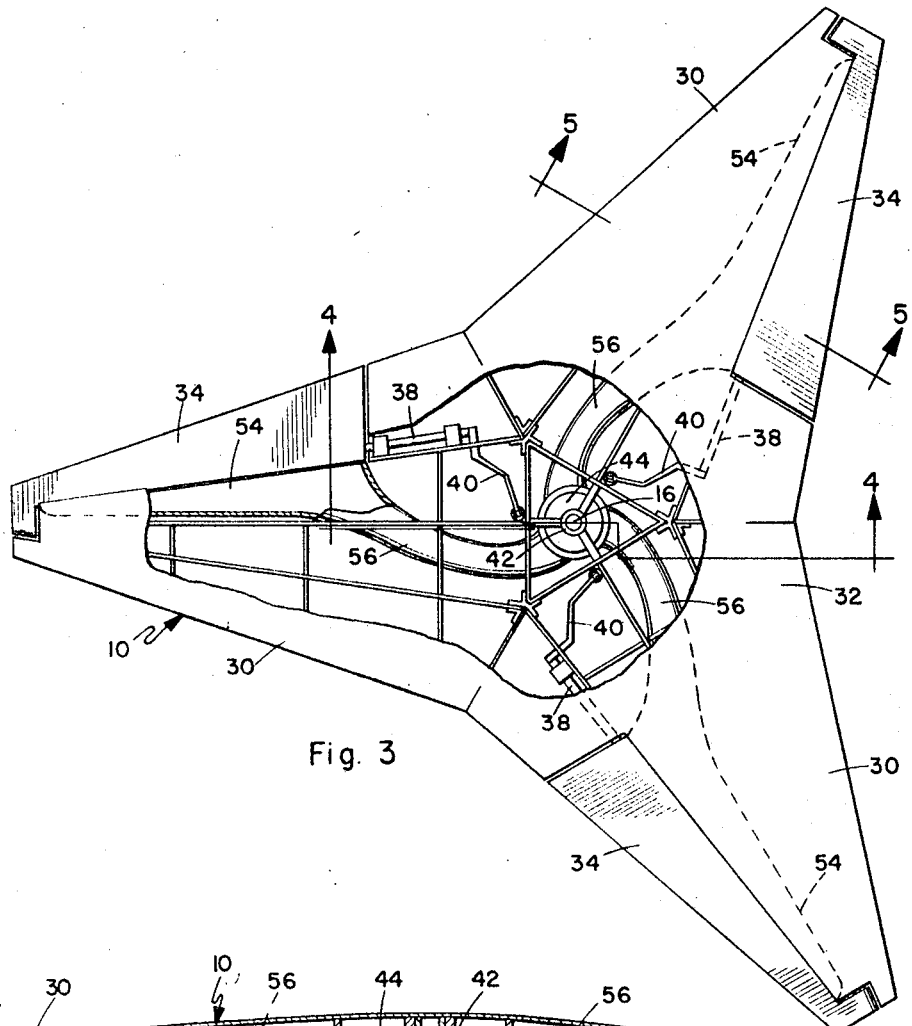
FIGURE 3 is an enlarged top plan view of the wing, with portions cut away.

The rotor/wing, hereinafter referred to simply as the wing 10, is shown in detail in FIGURES 3, 4 and 5. In its most practical form the wing has three arms 30 extending symmetrically about the axis of shaft 16, the arms being of generally triangular form with truncated tips and being joined by a large center section 32. In fixed position the plan form of the wing is that of a modified delta which is suitable for high speed flight. Each arm 30 has a generally lenticular airfoil in cross section and the wing is intended to rotate in a specific direction, which in this instance is counter-clockwise as viewed from above in FIGURE 3. Relative to the direction of rotation, the trailing edge of each arm 30 has a flap 34 hinged on a spanwise axis by hinge means 36 of suitable type. The flap is the complete thickness of the wing, so that the contours of both the upper and lower surfaces of the wing are changed by motion of the flap, effectively causing a change in camber. It should be noted that the flaps are quite large and extend over a major portion of the span of each arm, the chord of each flap being about 25% or more of the chord of the arm. Each flap 34 has a torque tube 38 extending into the center section 32, and on the inner end of the torque tube is an actuating arm 40 extending chordally forward and inwardly to a location near the central hub 42 of the wing. The internal structure of the wing as shown is representative only.

At hub 42 is a cylindircal plenum chamber 44 built into center section 32 and below the wing is a lower plenum chamber 46 fixed relative to the aircraft structure. Shaft 16 extends through lower plenum chamber 46 and is provided with a rotary seal 48, the connection between the two plenum chamber portions being made by a rotary seal 50. Various types of rotary seals may be used, such as labyrinth or carbon facing types, depending on whether the gases to be used are hot or cold. Lower plenum chamber 46 has a supply duct 52 for connection to a source of pressurized gas, as hereinafter described. Extending spanwise along the forward edge of each flap 34 is an elongated, slot-like ejection nozzle 54 connected to plenum chamber 44 by a duct 56, the nozzle being positioned to eject a flow of gas rearwardly over the top surface of the flap, as in FIGURE 5. The general configuration of such ducts is well known in boundary layer control techniques used on some fixed wing aircraft.

Since the aircraft as shown is powered by turbojet engines 14, the gases for the boundary layer control can be obtained from the engines, as in FIGURE 7. A connection to one engine is shown, but obviously both engines could be utilized. Supply duct 52 extends to the tailpipe 58 of engine 14, and at the junction is a diverter valve 60 actuated by an arm 62 to swing between a forward flight position and a vetrical flight position. In the latter position, shown in full line in FIGURE 5, diverter valve 60 blocks tailpipe 58 so that all exhaust gases are fed to the ejection nozzles 54. In the forward flight position, indicated in broken line, the diverter valve closes supply duct 52 and the exhaust gases are ejected from tailpipe 58 for normal thrust. Vertical and horizontal thrust can be modulated by varying the position of the diverter valve. If it is desired to use cold gas flow rather than the hot gases, the supply duct 52 may be connected by extension 64, indicated in broken line in FIGURE 7, to the compressor section 66 of engine 14. If turbofan engines are used, the bypass airflow may be utilized.

Figure 4:
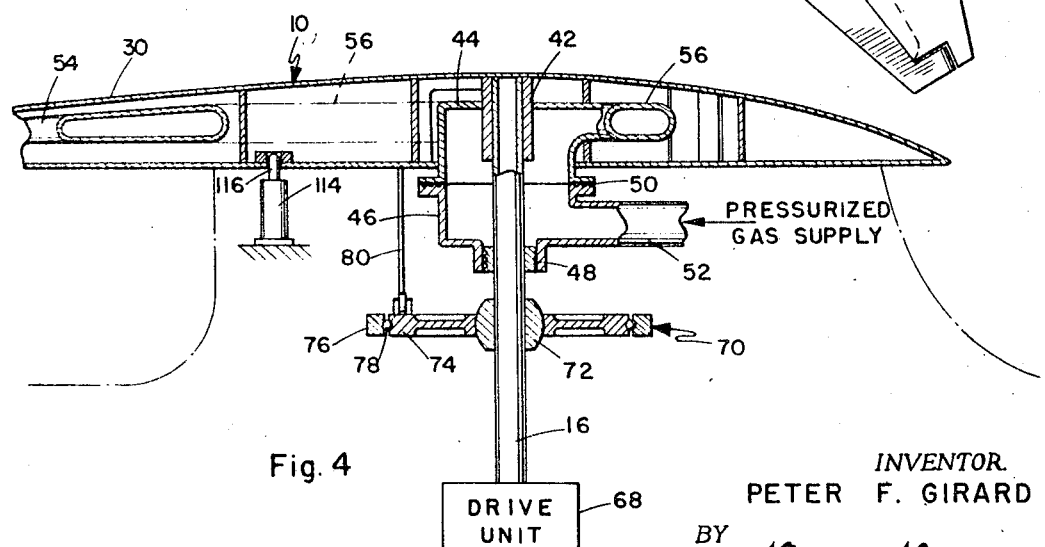
FIGURE 4 is an enlarged sectional view taken on line 4—4 of FIGURE 3.
Figure 5:
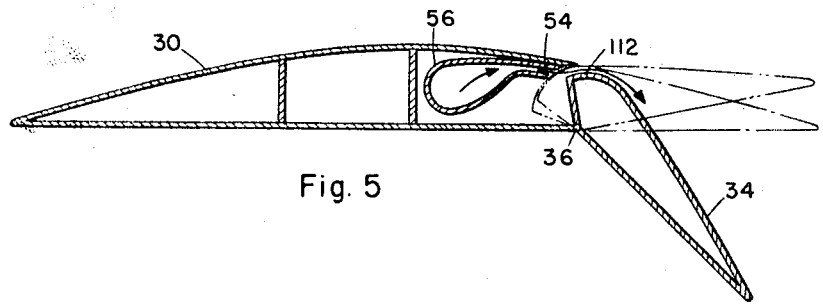
FIGURE 5 is an enlarged sectional view taken on line 5—5 of FIGURE 3.

The wing 10 may be rotated by various means, a drive unit 68 being indicated in FIGURE 4. This drive unit can be a shaft driven gear box or a power turbine connection driven by engines 14. One particularly suitable arrangement is shown and described in U.S. Patent No. 3,146,970, entitled Heliplane. The boundary layer gas supply system shown in FIGURE 7 could be combined with such a wing drive system from one or both engines. Alternatively, by using a sufficiently high gas flow rate, the gases ejected from nozzles 54 can be used to rotate the wing by direct thrust reaction. Such an arrangement would eliminate gears and drive means and would also eliminate rotor torque, although unit 20 or its equivalent would normally be retained for yaw control in vertical and low speed flight, when the tail control surfaces are ineffective.

Figure 6:
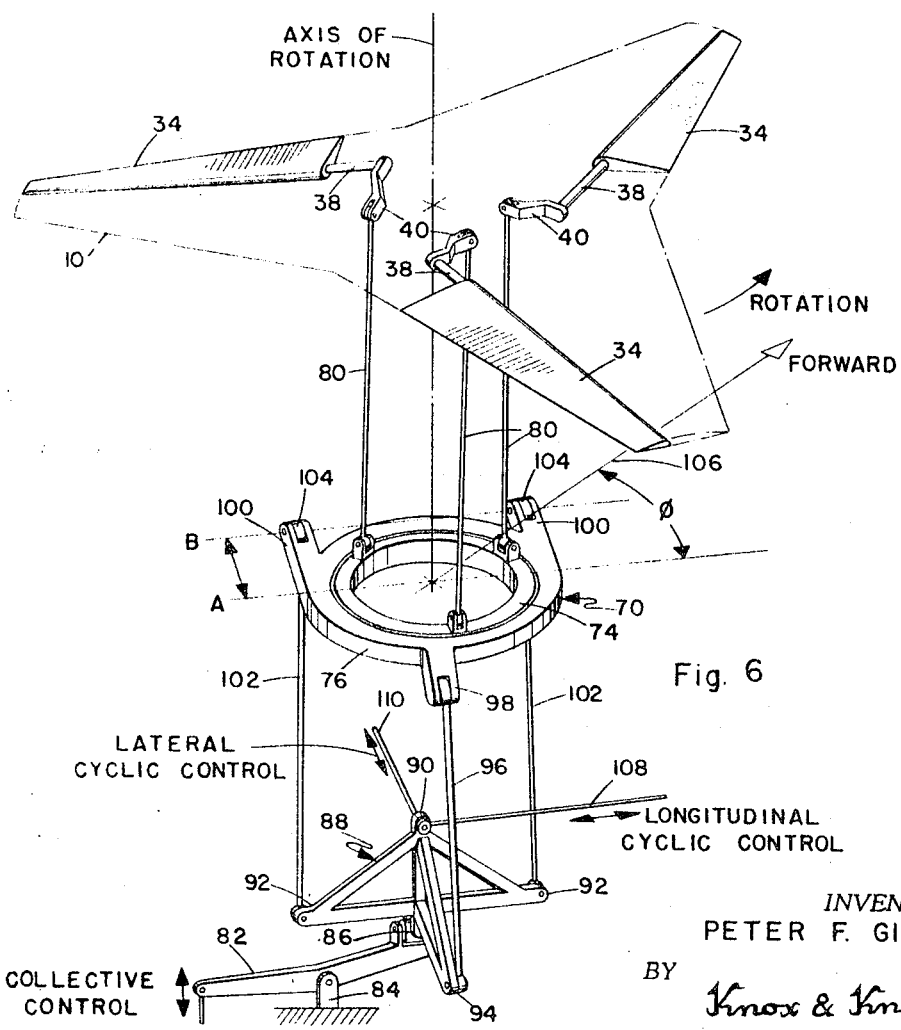
FIGURE 6 is a diagrammatic perspective view of the flap control system.

A suitable control system for the flaps is shown in FIGURES 4 and 6, this being a basic helicopter type system modified to suit the particular characteristics of the flapped rotary wing. Control is obtained by a swash plate 70 mounted coaxial with shaft 16 and being universally tiltable and axially slidable relative to the shaft, as by means of the ball element 72 in FIGURE 4. This ball element and the shaft are omitted from FIGURE 6 for clarity. Swash plate 70 has an inner ring 74, which is rotatable with shaft 16, and an outer ring 76 which is nonrotating, a suitable bearing 78 connecting the rings. From equally spaced circumferential positions on inner ring 74 link rods 80 are coupled to individual actuating arms 40, using ball type connections at both ends to accommodate the various motions. This basic control system is described in the above mentioned U.S. patent.

The mechanism for controlling the swash plate 70 comprises a collective pitch control arm 82 pivotally mounted on a bracket 84 on fixed structure of the aircraft, said control arm swinging in a generally vertical plane. One end of control arm 82 is coupled to suitable pilot's controls, of well known helicopter type, the other end carrying a universally pivotal head 86 on which is mounted a yoke 88. The yoke has an upright center post 90 with a pair of arms 92 extending on opposite sides and a third arm 94 extending perpendicular to the arms 92. From arm 94 a connecting rod 96 extends to a fork 98 projecting from outer ring 76 of the swash plate. On the opposite side of the outer ring 76 are two forks 100, which are coupled by connecting rods 102 to the ends of arms 92. All connecting rods 96 and 102 have ball type end connections, and the alignment of the pivotal ends 104 of the connecting rods in forks 100 is important to the proper operation of the flaps.

As inconventional helicopters, the swash plate connections are offset rotatively relative to the aircraft's longitudinal axis 106, represented by the directional arrow designated FORWARD in FIGURE 6, by a phase angle θ determined by the specific aircraft and rotor characteristics. The phase angle is indicated between longitudinal axis 106 and a reference center line A passing through the swash plate axis of rotation. In the present control system the pivotal ends 104 are also offset laterally on a center line B parallel to center line A, the common axis of ends 104 thus being at the same phase angle relative to longitudinal axis 106. This offset of the control connections, about which the swash plate pivots for lateral control, provides for minimum flap deflection at any lateral control displacement as each flap passes through the retreating portion of wing rotation relative to forward motion of the aircraft. When the wing rotation is being slowed down and stopped in forward flight, there will be flow reversal over the wing arms in the retreating sector. The minimizing of flap deflection in this sector ensures that there will be no lateral control reversal or cyclic control cross-coupling. The flaps in the advancing sector of blade rotation are thus responsible for substantially all of the lateral control force. This causes a small amount of lateral cyclic to collective cross-coupling, but this is tolerable and is readily compensated for by linkage coupled to the pilot's collective pitch controls. The specific arrangement will depend on the type of control system used and suitable mechanisms are well known.

The cyclic pitch controls of the aircraft are easily coupled to yoke 88 at the top of center post 90, as by a push-pull longitudinal control rod 108 moving substantially in the plane of arms 92 and a push-pull lateral control rod 110 moving in the plane of arm 94. Cable means or power actuators could also be used, according to the type of aircraft and services available.

In the above mentioned U.S. Patent No. 3,146,970 the entire outer arm portions of the wing are pivotal and are thus fully variable in cyclic pitch. In the present aircraft the major portions of the wing arms are fixed at essentially zero pitch and only the flaps are movable, which reduces the mass of the movable structure. However, from FIGURE 8 it can be seen that the rotating wing arms in the vertical flight mode are effectively at a negative angle of attack. Relating the vector diagram to the cross section of the wing and flap, the wing section is subject to an induced velocity $V_I$, since the wing is producing positive thrust. This negative vertical vector combines with the horizontal velocity $V_O$, due to rotation, to give the resultant velocity vector $V_R$ at a negative angle of attack relative to the wing section. The boundary layer control flow over the flap ensures a useful lift coefficient throughout the range of cyclic and collective pitch control by effectively deflecting the total airflow to enhance lift. It should be noted that the flaps are not used merely to deflect the gas flow, since very small surfaces would suffice for this. Rather, the boundary layer flow maintains efficient flow over the flaps at all deflection angles. The theory and effect of blown flaps and boundary layer control system of this type are well known.

In FIGURE 9, examples of various wing types are compared to illustrate the effect of the boundary layer control. The shaded area represents the required lift coefficients in the range of negative angles of attack which will be experienced. It should be understood that these are merely examples, since the lift coefficient and effective angle of attack will vary with the aircraft weight, ground effect, rotational speed, altitude, atmospheric conditions and other variable factors. A plain uncambered wing will not develop a lift coefficient anywhere in the required range and a plain cambered wing still falls short of the requirements, as evidenced at reference point X on the curve at its intersection with the angle of attack line. It can also be seen that a wing with a flap, of reasonable proportions, falls short of requirements, as indicated at reference point Y. However, when boundary layer control is used with the flap, the useful lift coefficient exceeds the required value, as at reference point Z. Control of lift coefficient is obtained through cyclic and collective varying of flap deflection while maintaining constant boundary layer flow, or by varying the boundary layer flow in conjunction with flap motion. This latter action is easily accomplished by suitable shaping of the leading edge portion 112 of flap 34, as in FIGURE 5, so that the actual outlet area for the gas flow is modulated by motion of the flap. The leading edge portion 112 is non-symmetrical about the axis of hinge 36 and may be of any specific shape to obtain the required ratio of gas flow to flap deflection.

In making a vertical take-off, the wing is rotated by whatever driving means is being used and, with the boundary layer flow in operation, the flaps are collectively lowered until the pitch reaches the proper value, when the aircraft will lift off the ground. In vertical flight the aircraft is flown in the manner of a helicopter and forward speed is attained by means of the longitudinal cyclic pitch control. As forward speed increases, the diverter valve 60 in one or both engines is shifted to allow some exhaust gases to escape rearwardly for added thrust. When transition speed is approached the collective flap deflection is reduced to near zero and all engine thrust is directed to forward propulsion, the wing then being in autorotation and the tail surfaces being used for control. The wing is brought to a stop by any suitable means, such as using the flaps for drag effect, the wing providing lift at all times during transition. Once stopped the wing is locked in place and becomes a modified delta type fixed wing. A locking unit 114 is shown in FIGURE 4 as an example, the locking unit having a retractable pin 116 which engages in the wing structure when the wing is stopped. Other suitable means for locking the wing is described in more detail in the above mentioned U.S. patent. In forward flight roll control is obtained by using the flap 30 on the right hand side of the aircraft, as viewed in FIGURE 2, as an aileron, the flap on the other side not being affected due to the above described offset of the swash plate connections. Alternatively, the elevon surfaces 26 may be used instead of or to supplement the flap action.

To make a vertical or near vertical landing the wing is unlocked and rotated, either by power or by raising the flaps and allowing air flow to autorotate the wing until suitable speed is reached. The landing is then made in the manner of a helicopter.

When lightly loaded the aircraft can be flown as a conventional fixed wing type. For short take-off and landing, the wing can be allowed to autorotate or be partially powered, this being particularly useful for heavily loaded aircraft. In the event of power failure the autorotation of the wing will provide lift and control for a safe landing to be made. It should be noted that in the autorotative mode boundary layer control is not required, since the air flow is generally upward through the rotating wing and the airfoils are effectively at positive angles of attack relative to the flow. Thus boundary layer control would not be essential in some short take-off and landing techniques, but would be required for vertical flight and hovering.

The aircraft is capable of operation in the rotary wing mode at disc loadings on the order of 15 to 25 pounds per square foot, and in the fixed wing mode at wing loadings on the order of 45 to 75 pounds per square foot. The entire wing is used to provide lift at all times in both modes and during transition, with no auxiliary surfaces or added power sources needed.

It is understood that minor variation from the form of the invention disclosed herein may be made without departure from the spirit and scope of the invention, and that the specification and drawings are to be considered as merely illustrative rather than limiting.

I claim:
1. In an aircraft having an airframe and propulsion means on said airframe, the improvement comprising:
   a combination rotor/wing mounted on said airframe for rotation in a predetermined direction about an axis is substantially perpendicular to the plane of the wing at the center of area thereof;
   said rotor/wing having a center section with a plurality of fixed lifting arms extending substantially radially therefrom;
   each of said arms having a trailing edge portion thereof hinged on a generally spanwise axis and comprising a flap;
   cyclic and collective pitch control means connected to said flaps to vary the pitch of the flaps relative to said arms;
   said cyclic control means including means to minimize flap deflection in the retreating sector of wing rotation at all positions of the collective and cyclic contol means;
   a rotational driving connection from said propulsion means to said rotor/wing;
   and locking means on said airframe to lock said wing selectively in a fixed, non-rotative position.

2. The structure of claim 1 and further including:
   an elongated gas ejecting nozzle in each of said arms immediately forward of the flap and disposed to direct a flow of gas rearwardly over the upper surface of the flap;
   flow control means controlling the gas flow in proportion to the flap deflection;
   and a source of pressurized gas connected to said nozzles.

3. The structure of claim 2, wherein the cross section of the leading edge portion of each of said flaps is non-symmetrical about the hinge axis of the flap, relative to the respective nozzle, to vary the effective outlet area of the nozzle relation to the deflection of the flap.

4. The structure of claim 1, wherein said means to minimize flap deflection includes a swash plate universally pivotally mounted coaxial with the axis of rotation of the wing and having circumferentially spaced connections to said flaps;
   said swash plate being hinged for lateral cyclic control motion on an axis laterally offset from the wing axis of rotation on the side of the retreating sector of wing roation and at a predetermined phase angle relative to the longitudinal axis of the aircraft, the phase angle and lateral offset being such that lateral control deflections of the flaps in the retreating sector of wing rotation are minimized;
   and connecting means coupling said swash plate, at said laterally offset axis, to an effectively fixed portion of said airframe.

References Cited
UNITED STATES PATENTS
| | | | |
|---|---|---|---|
| 2,879,013 | 3/1959 | Herrick | 244—7 |
| 3,045,947 | 7/1962 | Bertin et al. | 244—42 X |
| 3,134,444 | 5/1964 | Egerton et al. | 170—160.25 X |
| 3,146,970 | 9/1964 | Girard | 244—7 |

MILTON BUCHLER, Primary Examiner

THOMAS W. BUCKMAN, Assistant Examiner

U.S. Cl. X.R.

170—160.25, 135.4; 244—17.25, 42